(12) United States Patent
No

(10) Patent No.: US 8,276,284 B2
(45) Date of Patent: Oct. 2, 2012

(54) TILT-SENSING APPARATUS AND AUTOMATIC POSTURE CONTROL APPARATUS USING SAME

(76) Inventor: Ik Hwan No, Chuncheon-si (KR)

( * ) Notice: Subject to any disclaimer, the term of this patent is extended or adjusted under 35 U.S.C. 154(b) by 0 days.

(21) Appl. No.: 13/133,224

(22) PCT Filed: Nov. 24, 2009

(86) PCT No.: PCT/KR2009/006922
§ 371 (c)(1),
(2), (4) Date: Jun. 7, 2011

(87) PCT Pub. No.: WO2010/067972
PCT Pub. Date: Jun. 17, 2010

(65) Prior Publication Data
US 2011/0247225 A1  Oct. 13, 2011

(30) Foreign Application Priority Data
Dec. 8, 2008 (KR) .................. 10-2008-0124024

(51) Int. Cl.
*G01C 9/06* (2006.01)
(52) U.S. Cl. .................. 33/366.15; 33/366.11
(58) Field of Classification Search ............... 33/366.11, 33/366.15, 366.17
See application file for complete search history.

(56) References Cited

U.S. PATENT DOCUMENTS 3,559,294 A * 2/1971 Bauer ......................... 33/366.17
6,400,159 B1 * 6/2002 Zeller et al. ................ 33/366.11
6,442,855 B2 * 9/2002 Takeuchi et al. ........... 33/366.11
2007/0214667 A1 * 9/2007 Lin ............................. 33/366.11

FOREIGN PATENT DOCUMENTS

| JP | 63-022243 | 1/1988 |
| JP | 01-119710 | 5/1989 |
| JP | 2007-263700 | 10/2007 |
| KR | 10-1999-49390 | 7/1999 |
| KR | 10-2001-9673 | 2/2001 |
| KR | 10-378267 | 3/2003 |
| KR | 10-413952 | 12/2003 |

OTHER PUBLICATIONS

International Search Report for International Application No. PCT/KR2009/006922, May 25, 2010.

* cited by examiner

*Primary Examiner* — G. Bradley Bennett
(74) *Attorney, Agent, or Firm* — Kusner & Jaffe

(57) ABSTRACT

A tilt-sensing apparatus for sensing whether the tilt of an object exceeds a predetermined level, and to an automatic posture control apparatus using same. An amplifying lever moves along with a tilt lever which rotates in accordance with the level of fluid. in a balanced state, the end of the amplifying lever is spaced apart by a predetermined gap from a contact of a case. when the tilt of the object significantly exceeds a predetermined level, the case fixed at the object is tilted together with the object. the tilt lever in the case keeps the balanced state by the level of fluid, the tilt lever rotates in one direction relative to the case, and the rotational displacement of the tilt lever is amplified by the amplifying lever to enable contact sensors and contacts to be interconnected and turned to the ON state.

14 Claims, 7 Drawing Sheets

TILT-SENSING APPARATUS AND AUTOMATIC POSTURE CONTROL APPARATUS USING SAME

RELATED APPLICATIONS

This U.S. non-provisional patent application claims priority under 35 U.S.C. §119 to Korean Patent Application No. 10-2008-0124024, filed on Dec. 8, 2008, the entire contents of which are hereby incorporated by reference.

BACKGROUND OF THE INVENTION

The present disclosure herein relates to a tilt-sensing apparatus and an automatic posture control apparatus, and more particularly, to a tilt-sensing apparatus that can more delicately and precisely sense whether horizontality is maintained within a predetermined range and an automatic posture control apparatus that can immediately and automatically correct horizontality of a target when the target tilts beyond an allowable range.

Generally, many machines are designed to operate while maintaining a predetermined posture. For example, drum-type washing machines that are being widely used are rotated directly by a motor or indirectly by a belt while maintaining a chamber holding laundry in a horizontal state. Concrete mixer trucks mixing cement, gravel, and sand operate such that a concrete receiving drum smoothly rotates to keep concrete unhardened.

Also, expensive vehicles or express trains may include an apparatus that introduces a displacement for compensating for a centrifugal force generated according to a slope of a driving path to drive at a high speed.

In order to allow various machines and apparatuses to maintain a posture within a predetermined range in steps of design and manufacture or maintain a desired slope during movement thereof, the slope of machines and apparatuses have to be measured in real-time. However, a measuring rule for measuring an approximate slope at civil and architectural sites is disclosed in Korea Patent Registration No. 10-413952 and a complex hydraulic apparatus is disclosed in Korea Patent Registration No. 10-378267 to completely equip an apparatus for sensing a slope to maintain the slope within a certain slope range.

SUMMARY OF THE INVENTION

The present disclosure provides a tilt-sensing apparatus for more delicately and precisely sensing whether a slope of a target to be measured is within a predetermined range to maintain a posture of vehicles or other machines.

The present disclosure also provides a tilt-sensing apparatus that can be more economically manufactured.

The present disclosure also provides a tilt-sensing apparatus that can exactly and reliably measure a slope by measuring a tilt degree using the buoyancy of a fluid that always maintains horizontality thereof by gravity.

The present disclosure also provides a tilt-sensing apparatus that can more delicately and sensitively measure a slope by amplifying a slope variation using the lever principle regarding the level of a fluid with respect to a difference from a slope of a target to be measured.

The present disclosure also provides an automatic posture control apparatus that automatically maintains horizontality with high delicacy and sensitivity using a tilt-sensing apparatus.

Embodiments of the present invention provide tilt-sensing apparatuses including: a case sealed with a fluid partially filled and fixed to reflect a slope of a target to be measured; a tilt lever pivotably disposed in the case and pivoted by a buoyancy of the fluid; a first amplifying lever coupled to one side of the tilt lever to vertically move according to the buoyancy of the fluid when the case tilts to one side, the first amplifying lever having one side rotating in proportion to a rotation angle of the tilt lever after the other side thereof spaced from a center of rotation start to be interfered with a first gap control part projecting from an inner wall of the case; a second amplifying lever coupled to the other side of the tilt lever to vertically move according to the buoyancy of the fluid when the case tilts to the other side, the second amplifying lever having one side rotating in proportion to the rotation angle of the tilt lever after the other side thereof spaced from the center of rotation start to be interfered with a second gap control part projecting from the inner wall of the case; a first contact sensor fixed on the first amplifying lever to output an on-signal indicating that the tilt lever rotates beyond a predetermined angle in one direction when the tilt lever contacts a first contact at an inner side of the case due to rotation of the first amplifying lever caused by the rotation of the tilt lever in one direction by a rotation angle greater than a predetermined rotation angle; and a second contact sensor fixed on the second amplifying lever to output an on-signal indicating that the tilt lever rotates beyond the predetermined angle in the other direction when the tilt lever contacts a second contact at the inner side of the case due to rotation of the second amplifying lever caused by the rotation of the tilt lever in the other direction by a rotation angle greater than a predetermined rotation angle.

In some embodiments, a distance between a center of rotation of the first amplifying lever and a contact location with the first gap control part may be smaller than a distance between the center of rotation of the first amplifying lever and a contact location with the first contact, and a distance between a center of rotation of the second amplifying lever and a contact location with the second gap control part may be smaller than a distance between the center of rotation of the second amplifying lever and a contact location with the second contact.

In other embodiments, the fluid may be an insulating fluid.

In still other embodiments, the first gap control part may be adjustable such that the first amplifying lever is spaced from a horizontal position by a predetermined distance.

In even other embodiments, the tilt-sensing apparatus may further include a linkage wire connecting a first position spaced from a center of rotation of the first amplifying lever and a second position spaced from a center of rotation of the second amplifying lever to mutually link the rotation of the first and second amplifying levers such that the first contact sensor of the first amplifying lever and the second contact sensor of the second amplifying lever are not simultaneously in on-state.

In yet other embodiments, the tilt-sensing apparatus may further include a display receiving an on/off signal from the first and second contact sensors to display whether a tilt degree at which the tilt-sensing apparatus is installed is greater than a predetermined value.

In further embodiments, the tilt lever contacting the fluid may have a recessed part at a lower portion thereof and an air passage vertically penetrating therethrough.

In still further embodiments, the case may have a fluid passage to allow the fluid to flow in a longitudinal direction and a floating barrier to interrupt floating of the fluid in the longitudinal direction at a lower portion thereof.

In even further embodiments, the tilt-sensing apparatus may further include a current direction switching circuit for switching a direction of an applied current in an opposite direction when the first sensor is in on-state and the second contact sensor is in off-state, and when first contact sensor is in off-state and the second contact sensor is in on-state.

In other embodiments of the present invention, an automatic posture control apparatus, using a tilt-sensing apparatus, includes: a driving unit connected to a current direction switching circuit and switching a direction of an applied current in an opposite direction when a first sensor is in on-state and a second contact sensor is in off-state, and when a contact sensor is in off-state and a second contact sensor is in on-state; and a unit for controlling a tilt degree of a target into a horizontal state in conjunction with driving of the driving unit according to application of a current, wherein the tilt degree of the target is automatically adjusted into the horizontal state within a predetermined range by the driving of the driving unit.

BRIEF DESCRIPTION OF THE DRAWINGS

The accompanying drawings are included to provide a further understanding of the present invention, and are incorporated in and constitute a part of this specification. The drawings illustrate exemplary embodiments of the present invention and, together with the description, serve to explain principles of the present invention. In the drawings.

DETAILED DESCRIPTION OF THE INVENTION

Figure 1:
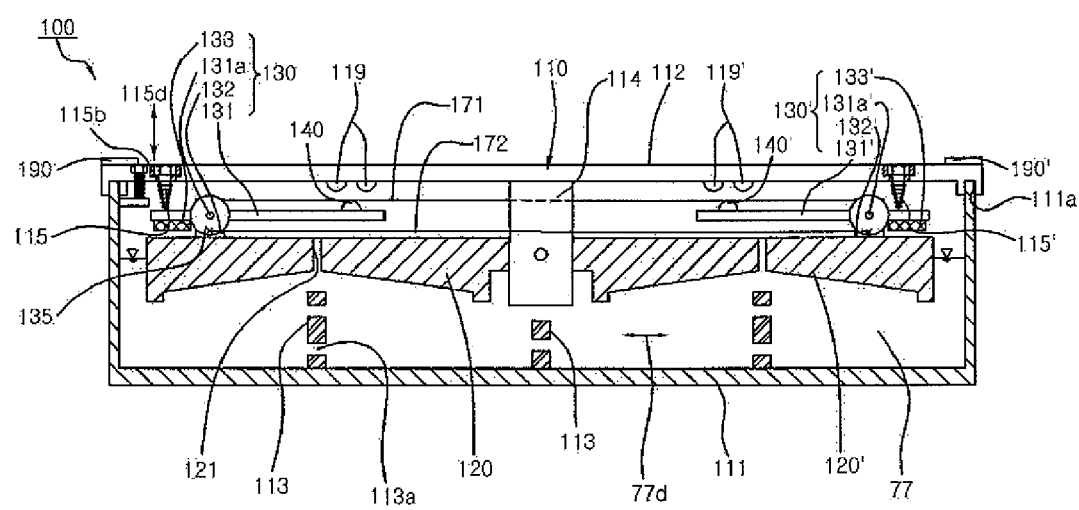
FIG. 1 is a cross-sectional view illustrating a tilt-sensing apparatus according to an exemplary embodiment of the present invention.

Exemplary embodiments of the present invention will be described below in more detail with reference to the accompanying drawings. The present invention may, however, be embodied in different forms and should not be construed as limited to the embodiments set forth herein. Rather, these embodiments are provided so that this disclosure will be thorough and complete, and will fully convey the scope of the present invention to those skilled in the art.

Hereinafter, a tilt-sensing apparatus 100 according to an exemplary embodiment of the present invention will be described in detail with reference to the accompanying drawings.

For explanation of the present invention, known functions and configurations will be assigned with identical or similar reference numerals and a detailed description thereof will be omitted to clarify the essential point of the present invention.

Figure 2:
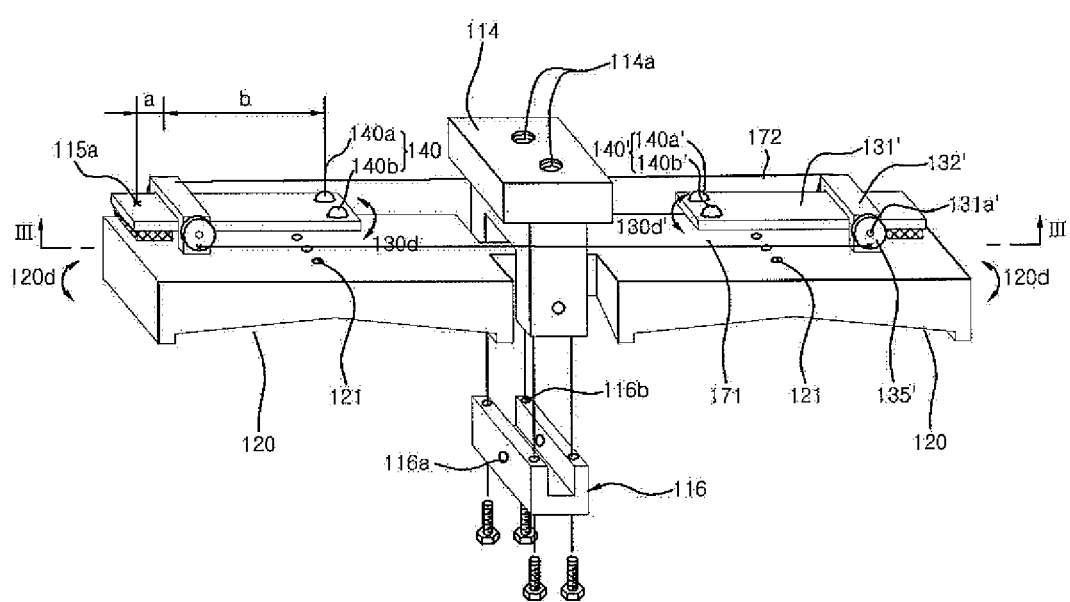
FIG. 2 is a perspective view illustrating a peripheral configuration of a tilt lever of FIG. 1.
Figure 3:
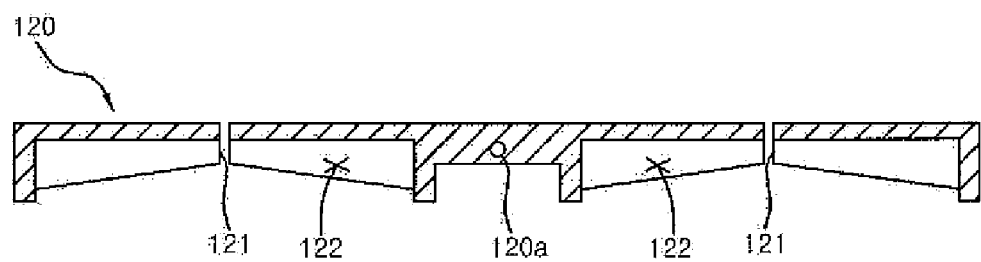
FIG. 3 is a cross-sectional view taken along line III-III of FIG. 2.
Figure 4:
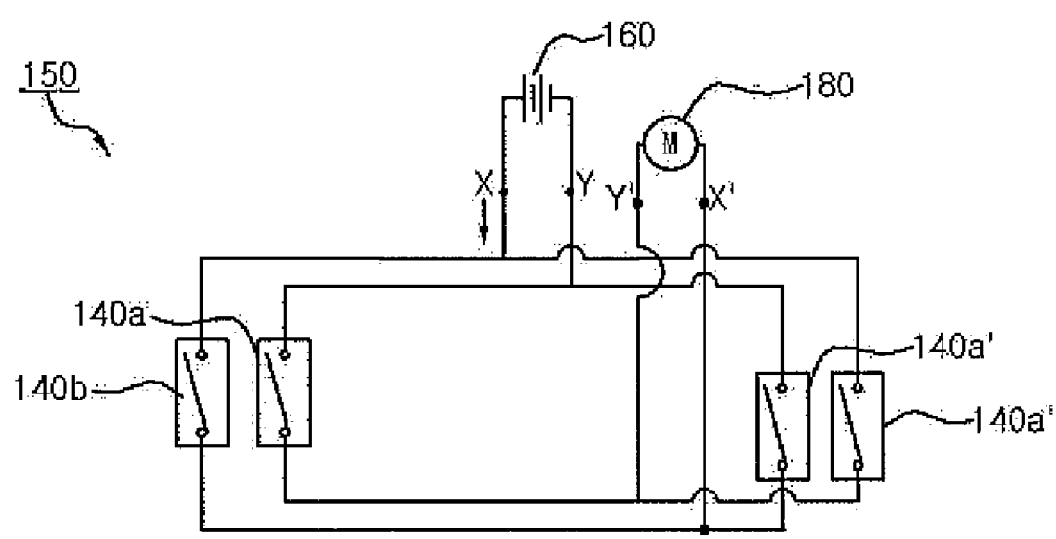
FIG. 4 is a view illustrating a current direction switching circuit of the tilt-sensing apparatus of FIG. 1.
Figure 5:
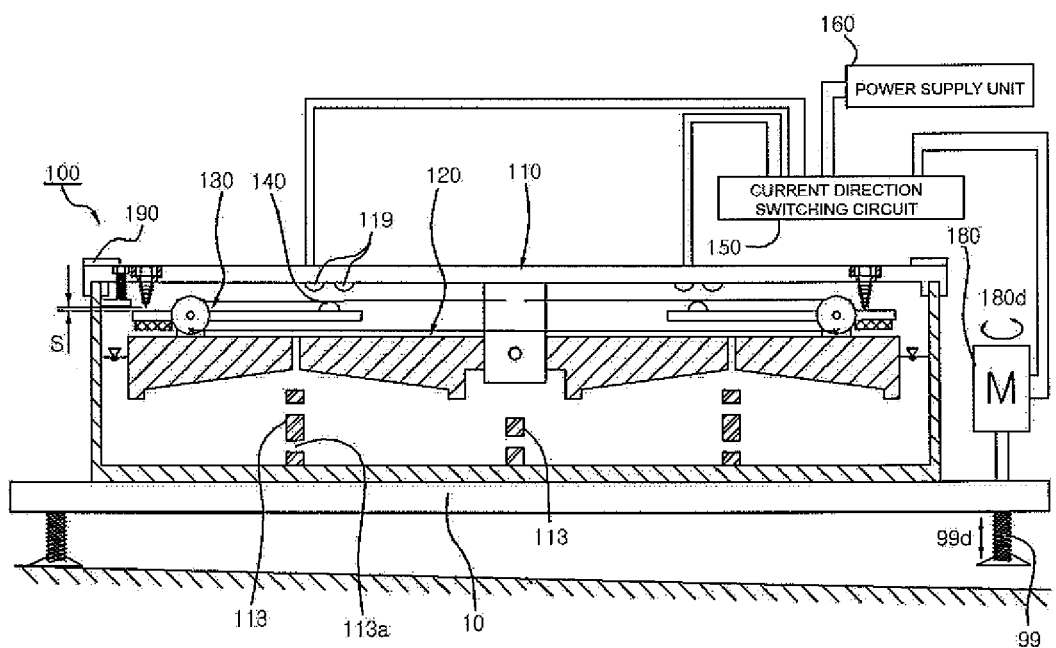
FIG. 5 is a view illustrating a configuration of controlling horizontality using the tilt-sensing apparatus of FIG. 1.

FIG. 1 is a cross-sectional view illustrating a tilt-sensing apparatus according to an exemplary embodiment of the present invention. FIG. 2 is a perspective view illustrating a peripheral configuration of a tilt lever of FIG. 1. FIG. 3 is a cross-sectional view taken along line III-III of FIG. 2. FIG. 4 is a view illustrating a current direction switching circuit of the tilt-sensing apparatus of FIG. 1. FIG. 5 is a view illustrating a configuration of controlling horizontality using the tilt-sensing apparatus of FIG. 1.

Referring to FIGS. 1 to 5, a tilt-sensing apparatus 110 may include a case 110, a tilt lever 120, gap control parts 115 and 115', first and second amplifying lever parts 130 and 130', first and second contact sensors 140 and 140', a current direction switching circuit 150, linkage wires 171 and 172, a motor 180, and displays 190 and 190'. The case 110 may be partially filled with an insulation fluid 77, and may be sealed. The case 110 may be fixed on a target 10 to be measured. The tilt lever 120 may be pivotably coupled to the case 110 to rotate in a direction 120d represented in FIG. 2. The tilt lever 120 may be rotated by the buoyancy of the insulation fluid 77. The gap control parts 115 and 115' may protrude from the inner wall of the case 110. The gap control parts 115 and 115' may be fixed on the top surface of both sides of the tilt lever 120 that is rotated by the buoyancy of the insulation fluid 77 when the case tilts to one side. The gap control parts 115 and 115' may vertically move in conjunction with the tilt lever 120. The first and second amplifying lever parts 130 and 130' may rotate in directions 130d and 130d' represented in FIG. 2 in proportion to the rotation angle of the tilt lever 120 after an interference. The first and second contact sensors 140 and 140' may be fixed on the top surface of the ends of first and second amplifying levers 131 and 131', respectively. The first and second contact sensors 140 and 140' may contact first and second contacts 119 and 119' on the inner wall of the case 110 when the rotation angle of the tilt lever 120 becomes greater than a predetermined angle. The current direction switching circuit 150 may switch the current direction such that currents of different directions are applied to the motor 180 when the first and second contact sensors 140 and 140' contact the contacts 119 and 119', respectively. The linkage wires 171 and 172 may mutually connect a first location spaced from the center of rotation of the first amplifying lever 131 and a second location spaced from the center of rotation of the second amplifying lever 131' such that the first contact sensor 140 and the second contact sensor 141' do not simultaneously contact the first contact 119 and the second contact 119', respectively. The motor 180 may be rotated in different directions when the first and second contacts 119 and 119' are powered on by the current direction switching circuit 150, respectively. The displays 190 and 190' may display different colors at different locations to allow a user to visually check which direction the target 10 tilts to when the target 10 to be measured tilts to one side beyond a predetermined tilt angle to cause one of contacts 119 and 119' to be turned on.

The case 110 may include a lower case 111, a cover 112, a floating barrier 113, a support body 114, gap control screws 115 and 115', and a lower support body 116. The lower case 111 may hold the fluid 77. The cover 112 may have a groove 111a coupled to the end of the lower case 111 to seal the case 110. The floating barrier may protrude from the bottom of the lower case 111 to prevent rocking of the fluid 77 in the longitudinal direction of the tilt lever 120 and shaking of the tilt lever 120. The support body 114 may be fixed on the inner wall of the cover 112 by a bolt coupling to rotatably support the tilt lever 120. The gap control screws 115 and 115' may downwardly protrude from the cover 112, and may restrict the upward movement of the first and second amplifying levers 131 and 131' to rotate the first and second amplifying levers 131 and 131' in proportion to the rotation angle of the tilt lever 120. When the tilt lever 120 is installed in pair, the lower support body 116 may be coupled to a lower portion of the support body 114 to be fixed perpendicularly to the tilt lever 120.

Here, in order to sense the slope of a target with high sensitivity, the gap control screws 115 and 115' may be maintained such that the end thereof contacts the amplifying levers 131 and 131' that is in the horizontal state when the tilt lever 120 is in the completely horizontal state, but the gap control screws 115 and 115' may be adjusted such that the end thereof is spaced from the amplifying levers 131 and 131' that is in the horizontal state by a predetermined distance S (hereinafter, referred to as gap). In this case, the gap control screws 115 and 115 may be rotated while being engaged with a female screw hole (not shown) of the case 110 to adjust the gap S between the gap control screws 115 and 115' and the amplifying levers 131 and 131' in a direction 115d. Then, in order to maintain the gap S, a gap 115b between the gap control screws 115 and 115' and the female screw hole may be sealed.

The lower support body 116 may be used when the tilt lever 120 is disposed in pair. As shown in FIG. 2, four screws may penetrate through holes 116b to be screwed into screw holes (not shown) in the undersurface of the support body 114. Also, another tilt lever may be rotatably coupled by a pivot pin that is inserted into a pivot pin hole 116a.

As shown in FIGS. 1 and 5, a fluid passage 113a may be formed through the floating barrier 113. The fluid passage 113 may be formed to have a relatively greater diameter such that a fluid in the case 110 is prevented from rocking and is allowed to flow in the longitudinal direction of the tilt lever 120 without any resistance.

The unexplained reference numeral 114 denotes a screw hole that is formed to integrally fix the cover 112 and the support body 114.

The tilt lever 120 may be pivotably coupled to the support body 114. Since the tilt lever 120 maintains the horizontality by the buoyancy of the fluid 77 that maintains the surface of horizontality in spite of tilt of the case 110, the tilt lever 120 may show a relative rotational displacement with respect to the case 110 that rotates together with a target. As shown in FIG. 3, a recessed part 122 may be formed in the undersurface of the tilt lever 120 that contacts the fluid 77. The recessed part 122 may be formed to directly and efficiently receive an influence by the buoyancy of the fluid 77. Also, an air passage 121 may be vertically formed through the tilt lever 120 to prevent misalignment between the tilt lever 120 and the surface of the fluid 77, caused by bubbles between the tilt lever 120 and the fluid 77.

The amplifying lever parts 130 and 130' may include the amplifying levers 131 and 131' pivotably fixed on the both ends of the tilt lever 120, spaced from the center of rotation of the tilt lever 120, and fixing parts 132 and 132' pivotably fixing the amplifying levers 131 and 131'. In the ease where the amplifying levers 131 and 131' are in the horizontal state, the gap control screws 115 and 115' spaced from the center of rotation 131a and 131a' of the amplifying levers 131 and 131' by a certain distance A may be spaced from the amplifying levers 131 and 131' by a certain gap S or may maintain a contact state to obtain higher sensitivity such that, when the tilt lever 120 moves upward, the amplifying lever 131 or 131' on the upwardly moving side contacts the gap control screw 115 or 115' and then rotates by a rotation angle in accordance with the rotational displacement of the tilt lever 120. Thus, when the tilt lever 120 rotates in one direction, the outer side of the amplifying levers 131 and 131' may be inhibited from moving upward by the gap control screws 115 and 115'. Accordingly, the contact sensors 140 and 140' disposed at an inner side of the amplifying levers 131 and 131' may rotate by a displacement amplified by a lever ratio b/a shown in FIG. 2.

The contact sensors 140 and 140' may be disposed in pair on the surface of the inner side of the amplifying levers 131 and 131', respectively. The contact sensors 140 and 140' may be disposed on the opposite sides to the contact 115a of the amplifying levers 131 and 131' with the gap control screws 115 and 115'. The first contact sensors 140a and 140b may be disposed on the inner end of the first amplifying lever 131, spaced from the center of rotation 131a by the same distance, and the second contact sensor 140a' and 140b' may be disposed on the inner end of the second amplifying lever 131', spaced from the center of rotation 131a' by the same distance. Thus, when the tilt lever 120 rotates in one direction by an angle greater than a predetermined angle, one pair of the contact sensors 140 and 140' of the first or second amplifying lever 131 or 131' may contact the contacts 119 and 119' fixed on the inner surface of the case 110 (on-state), and the other pair of the contact sensors 140 and 140' may not contact the contacts 119 and 119' fixed on the inner surface of the case 110 (off-state), thereby outputting these signals.

As shown in FIG. 4, although the direction of a current supplied from the power supply unit 160 is constant, the current direction switching circuit 150 may contact only one pair of the contact sensors 140 and 140', allowing the direction of the current outputted to the motor 180 to be switched.

More specifically, as shown in FIG. 4, a point denoted as X may be connected to a positive (+) electrode, and a point denoted as Y may be connected to a negative (−) electrode. In this case, when a target to be measured tilts downward to the left side, the left side of the tilt lever 120 may move upward, and the right side of the tilt lever 120 may move downward in FIG. 1, allowing the tilt 120 to counter-rotate with respect to the case 110. Thus, when the first amplifying lever 131 located at the left side of the tilt lever 120 moves by a predetermined gap S, and then one side of the first amplifying lever 131 contacts the contact 115a of the first gap control screw 115, the first amplifying lever 131 may start to rotate in proportion to the rotation displacement of the tilt lever 120 to generate a rotation displacement b/a times greater than the rotational displacement of the tilt lever 120 at the other side (inner side) of the first amplifying lever 131. In this case, when the rotation angle of the tilt lever 120 exceeds a predetermined allowable range, the first contact sensors 140a and 140b disposed at the other side of the first amplifying lever 131 may contact a pair of the first contacts 119 to become on-state, and the second contact sensors 140a' and 140b' disposed at the other side (inner side) of the second amplifying lever 131' may not contact the second contact 119' to become off-state. Accordingly, the direction of a current applied to the motor 180 in the current direction switching circuit 150 shown in FIG. 4 may become positive (+) at a point X' and negative (−) at a point Y'.

On the other hand, when a target to be measured tilts downward to the right side, the right side of the tilt lever 120 may move upward, and the left side of the tilt lever 120 may move downward in FIG. 1, allowing the tilt 120 to counter-rotate with respect to the case 110. Thus, when the second amplifying lever 131' located at the right side of the tilt lever 120 moves by a predetermined gap S, and then one side of the second amplifying lever 131' contacts the contact 115a of the second gap control screw 115', the second amplifying lever 131' may start to rotate in proportion to the rotation displacement of the tilt lever 120 to generate a rotation displacement b/a times greater than the rotational displacement of the tilt lever 120 at the other side (inner side) of the second amplifying lever 131'. In this case, when the rotation angle of the tilt lever 120 exceeds the predetermined allowable range, the second contact sensors 140a' and 140b' disposed at the other side of the first amplifying lever 131 may contact a pair of the second contacts 119' to become on-state, and the first contact sensors 140a and 140b disposed at the other side (inner side) of the first amplifying lever 131 may not contact the first contact 119 to become off-state. Accordingly, the direction of a current applied to the motor 180 in the current direction switching circuit 150 shown in FIG. 4 may become negative (−) at a point X' and positive (+) at a point Y'.

In other words, although the point denoted as X may be connected to the positive (+) electrode, and the point denoted as Y may be connected to the negative (−) electrode, the direction of a current applied to the motor 180 the first contact sensor 140 may be switched when the first contact sensor 140 becomes on-state and the second contact sensor 140' becomes on-state, respectively. Thus, by configuring an interconnection of a switch as shown in FIG. 5 without a separate control unit, an tilted state of a target to be measured may be restored by one driving unit 180 including a motor or a hydraulic apparatus.

A pair of pulleys 135 may be fixed on the center of rotation 131a and 131a' of the amplifying levers 131 and 131' to rotate together with the amplifying levers 131 and 131'. As shown in FIGS. 1 and 2, one linkage wire 172 may be connected between the lower side of one pulley 135 rotating together with the first amplifying lever 131 and the lower side of the one pulley 135' rotating together with the second amplifying lever 131'. The other linkage wire 171 may be connected between the upper side of the other pulley 135 rotating together with the first amplifying lever 131 and the upper side of the other pulley 135' rotating together with the second amplifying lever 131'. In this case, the linkage wires 171 and 172 may be maintained in a tight state. The first amplifying lever 131 and the second amplifying lever 131' may always rotate in the same direction due to the linkage wire 171. Accordingly, one pair of the contact sensors 140 and 140' may be prevented from becoming on-state when other pair of the contact sensors 140 and 140' is in on-state, thereby achieving a more reliable operation environment.

As shown in FIG. 5, an automatic posture control apparatus installed on the target 10 to be measured may be configured using the tilt-sensing apparatus 100 according to an embodiment of the present invention. In this case, the motor 180, which is a driving unit for maintaining the target in a horizontal state, may be installed so as to rotate a control screw rod for controlling the height of the target 10. Although the automatic posture control apparatus according to an embodiment of the present invention has been described as including the motor 180 as a driving unit, it should be understood that any other driving unit for displacement control can be used as the driving unit for maintaining the target 10 in a horizontal state.

In such a configuration, when the horizontality of the target 10 exceeds a predetermined range, allowing one pair of contact sensors 140 and 140' to contact the contacts 119 and 119' due to the rotation of the amplifying levers 131 and 131' of the tilt-sensing apparatus 100 (In FIG. 5, the first contact sensor 140 of the first amplifying lever 131 contacts the first contact 119 to become on-state), a current may be delivered via the current direction switching circuit 150 from the power supply unit 160 to rotate the motor 180 in one direction. In this case, a support 99 rotating in conjunction with the motor 180 may move downward to allow the target 10 to become horizontal (state where a current is not delivered to the motor because any of contact sensors 140 and 140' does not become on-state). In such a state, there is an advantage in that slope variation can be controlled using one motor at the initial installation stage of a machine. Also, even though a machine that has been already installed or is operating or moving is tilted due to external factors, the tilt of the machine can be immediately sensed and restored to the horizontal state by a motor.

Hereinafter, another exemplary embodiment of the present invention will be described in detail with reference to the accompanying drawings. However, in order to clarify the essential points of the previous embodiment of the present invention, components identical or corresponding to those of the previous embodiment will be assigned with reference numerals starting as 2, and a detailed description thereof will be omitted herein because it can be easily understood by those skilled in the art.

Figure 6:
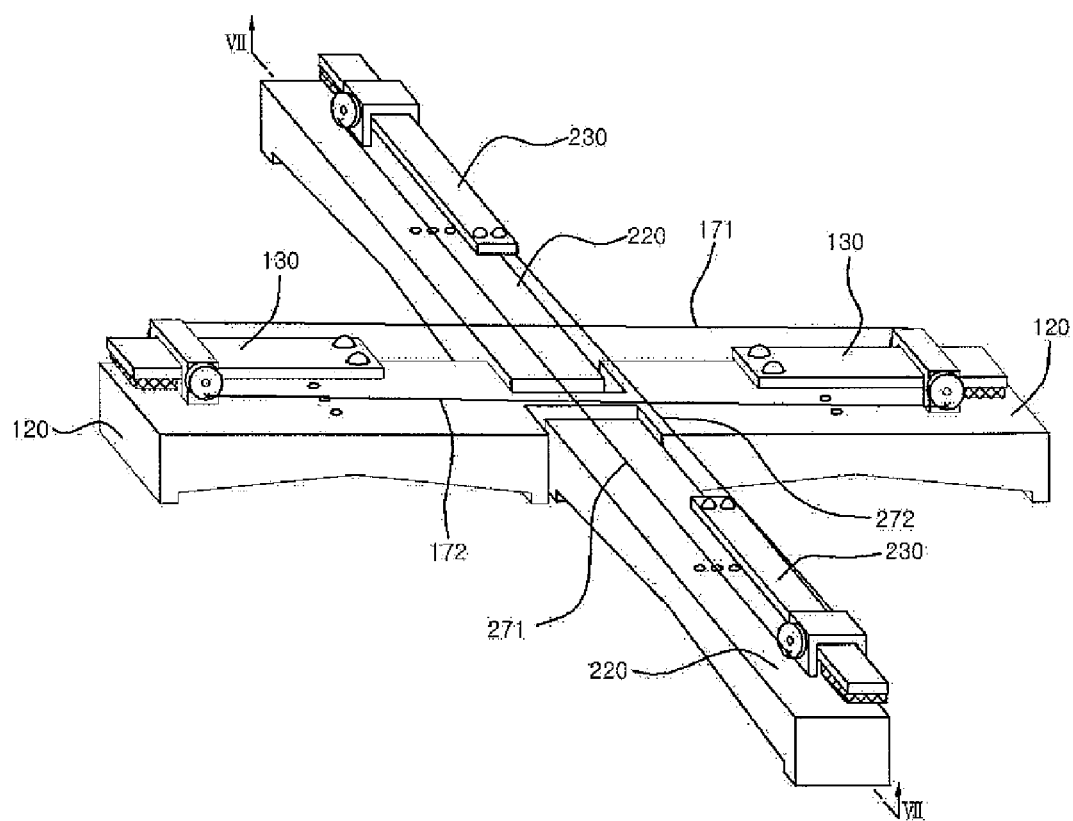
FIG. 6 is a perspective view illustrating a peripheral configuration of a tilt lever of a tilt-sensing apparatus according to another exemplary embodiment of the present invention.
Figure 7:
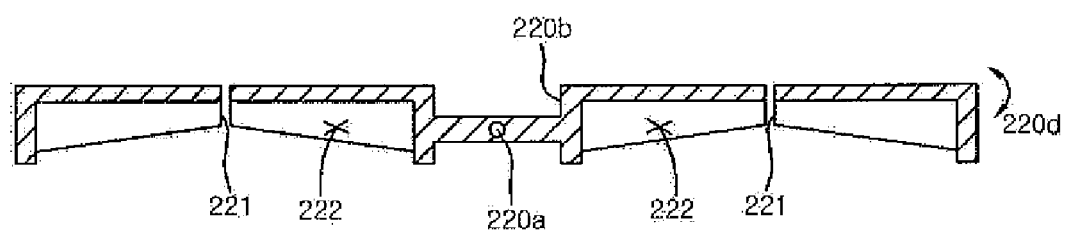
FIG. 7 is a cross-sectional view taken along line VII-VII of FIG. 6.

FIG. 6 is a perspective view illustrating a peripheral configuration of a tilt lever of a tilt-sensing apparatus according to another exemplary embodiment of the present invention. FIG. 7 is a cross-sectional view taken along line VII-VII of FIG. 6.

As shown in the drawings, the tilt-sensing apparatus according to another embodiment of the present invention may differ from the tilt-sensing apparatus 100 of the previous embodiment in that the tilt-sensing apparatus according to another embodiment includes two tilt levers 120 and 220. In order to provide two rotation axes at the central part, the second tilt lever 220 below the first tilt lever 120 may be configured to be supported such that the center of rotation 220a located at the central part thereof is penetrated by a pivot pin (not shown) while being aligned with the pivot pin hole 116a of the lower support body 116 of FIG. 1. An upward lever receiving part 220b may be located at the central part of the second tilt lever 220. The upward lever receiving part 220b may be recessed so as to have a smaller thickness while accepting a rotational displacement of the tilt lever 120.

Similarly to the tilt lever 120, a recessed part 222 may be formed under the second tilt lever 220 contacting the fluid 77 to efficiently receive an influence by the buoyancy of the fluid 77 as shown in FIG. 7. An air passage 221 may vertically penetrate the second tilt lever 220 to prevent misalignment between the second tilt lever 220 and the surface of the fluid 77, caused by bubbles between the second tilt lever 220 and the fluid 77.

The current direction switching circuit of the tilt-sensing apparatus as configured above may be achieved by configuring the circuit shown in FIG. 4 as a parallel circuit.

According to such a configuration, the tilt-sensing apparatus 100 may be in a state where the end of the amplifying levers 131 and 131' moving in conjunction with the tilt lever 120 and 220 pivotably moving according to the level of the fluid is spaced from the contacts 119 and 119' of the case by a certain gap when the tilt-sensing apparatus 100 is in the horizontal state. On the other hand, when the tilt-sensing apparatus 100 is in the measurement state, the case 110 may be fixed to reflect the slope of the target 10 to be measured, and therefore a rotational displacement in one direction of the tilt levers 120 and 220 may be generated. When the rotational displacement is amplified by the amplifying levers 131 and 131' and contacts the contact 140 at one side thereof to become on-state, it is more precisely and sensitively sensed by a cheap apparatus whether the target 10 to be measured is tilted to one side beyond a predetermined range.

As described above, the present invention provides a tilt-sensing apparatus having a high sensitivity and accuracy by an amplifying lever while excluding expensive components such as a hydraulic apparatus.

The present invention can be variously applied to machines that should be strictly or loosely maintained in a horizontal state, by variously setting a predetermined slope variation using a lever ratio (a/b) of first and second amplifying levers or adjustment of a projecting position of a contact fixed in the case.

The present invention can easily sense a slope of a target that stands still or is moving by allowing a fluid held in a case to have various viscosities according to the target to be measured.

Particularly, the present invention can easily measure a slope variation of a machine requiring a highly precise horizontality more sensitively and precisely by allowing a distance between a center of rotation of an amplifying lever to a contact position with a gap control part protruding from a case to be smaller than a distance between the center of rotation of the amplifying lever and a contact sensor located at the opposite side with respect to the gap control part.

The tilt lever contacting the fluid has a recessed part to allow the tilt lever to more reliably move due to a buoyancy of the fluid, and an air passage for discharging air bubbles between the fluid and the tilt lever to the outside.

Although exemplary embodiments of the present invention have been described as above, the scope of the present invention is not limited to a specific embodiment described above, but can be properly modified within the scope of claims described below.

The above-disclosed subject matter is to be considered illustrative and not restrictive, and the appended claims are intended to cover all such modifications, enhancements, and other embodiments, which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

Having described the invention, the following is claimed:

1. A tilt-sensing apparatus comprising:
   a case sealed with a fluid partially filled and fixed to reflect a slope of a target to be measured;
   a tilt lever pivotably disposed in the case and pivotably rotating by a buoyancy of the fluid;
   a first amplifying lever coupled to one side of the tilt lever to vertically move according to the buoyancy of the fluid when the case tilts to one side, the first amplifying lever having one side rotating in proportion to a rotation angle of the tilt lever after the other side thereof spaced from a center of rotation start to be interfered with a first gap control part projecting from an inner wall of the case;
   a second amplifying lever coupled to the other side of the tilt lever to vertically move according to the buoyancy of the fluid when the case tilts to the other side, the second amplifying lever having one side rotating in proportion to the rotation angle of the tilt lever after the other side thereof spaced from the center of rotation start to be interfered with a second gap control part projecting from the inner wall of the case;
   a first contact sensor fixed on the first amplifying lever to output an ON-signal indicating that the tilt lever rotates beyond a predetermined angle in one direction when the tilt lever contacts a first contact at an inner side of the case due to rotation of the first amplifying lever caused by the rotation of the tilt lever in one direction by a rotation angle greater than a predetermined rotation angle; and
   a second contact sensor fixed on the second amplifying lever to output an ON-signal indicating that the tilt lever rotates beyond the predetermined angle in the other direction when the tilt lever contacts a second contact at the inner side of the case due to rotation of the second amplifying lever caused by the rotation of the tilt lever in the other direction by a rotation angle greater than a predetermined rotation angle.

2. The tilt-sensing apparatus of claim 1, wherein a distance between a center of rotation of the first amplifying lever and a contact location with the first gap control part is smaller than a distance between the center of rotation of the first amplifying lever and a contact location with the first contact, and a distance between a center of rotation of the second amplifying lever and a contact location with the second gap control part is smaller than a distance between the center of rotation of the second amplifying lever and a contact location with the second contact.

3. The tilt-sensing apparatus of claim 1, wherein the fluid is an insulating fluid.

4. The tilt-sensing apparatus of claim 1, wherein the first gap control part is adjustable such that the first amplifying lever is spaced from a horizontal position by a predetermined distance.

5. The tilt-sensing apparatus of claim 1, further comprising a linkage wire connecting a first position spaced from a center of rotation of the first amplifying lever and a second position spaced from a center of rotation of the second amplifying lever to mutually link the rotation of the first and second amplifying levers such that the first contact sensor of the first amplifying lever and the second contact sensor of the second amplifying lever are not simultaneously in on-state.

6. The tilt-sensing apparatus of claim 1, further comprising a display receiving an on/off signal from the first and second contact sensors to display whether a tilt degree at which the tilt-sensing apparatus is installed is greater than a predetermined value.

7. The tilt-sensing apparatus of claim 1, wherein the tilt lever contacting the fluid has a recessed part at a lower portion thereof and an air passage vertically penetrating therethrough.

8. The tilt-sensing apparatus of claim 1, wherein the case has a fluid passage to allow the fluid to flow in a longitudinal direction and a floating barrier to interrupt floating of the fluid in the longitudinal direction at a lower portion thereof.

9. The tilt-sensing apparatus of claim 1, further comprising a current direction switching circuit for switching a direction of an applied current in an opposite direction when the first sensor is in on-state and the second contact sensor is in off-state, and when first contact sensor is in off-state and the second contact sensor is in on-state.

10. An automatic posture control apparatus using a tilt-sensing apparatus according to claim 1, comprising:
   a current direction switching circuit for switching a direction of an applied current in an opposite direction when the first sensor is in on-state and the second contact sensor is in off-state, and when first contact sensor is in off-state and the second contact sensor is in on-state;
   a driving unit connected to a current direction switching circuit and switching a direction of an applied current in an opposite direction when a first sensor is in on-state and a second contact sensor is in off-state, and when a contact sensor is in off-state and a second contact sensor is in on-state; and
   a unit for controlling a tilt degree of a target into a horizontal state in conjunction with driving of the driving unit according to application of a current, wherein the tilt degree of the target is automatically adjusted into the horizontal state within a predetermined range by the driving of the driving unit.

11. The automatic posture control apparatus of claim 10, wherein a distance between a center of rotation of the first amplifying lever and a contact location with the first gap control part is smaller than a distance between the center of rotation of the first amplifying lever and a contact location with the first contact, and a distance between a center of rotation of the second amplifying lever and a contact location with the second gap control part is smaller than a distance between the center of rotation of the second amplifying lever and a contact location with the second contact.

12. The automatic posture control apparatus of claim 10, wherein the fluid is an insulating fluid.

13. The automatic posture control apparatus of claim 10, wherein the first gap control part is adjustable such that the first amplifying lever is spaced from a horizontal position by a predetermined distance.

14. The automatic posture control apparatus of claim 10, further comprising a linkage wire connecting a first position spaced from a center of rotation of the first amplifying lever and a second position spaced from a center of rotation of the second amplifying lever to mutually link the rotation of the first and second amplifying levers such that the first contact sensor of the first amplifying lever and the second contact sensor of the second amplifying lever are not simultaneously in on-state.

* * * * *